(12) United States Patent
Chen et al.

(10) Patent No.: US 7,251,668 B2
(45) Date of Patent: Jul. 31, 2007

(54) CONFIGURATION MANAGEMENT FILE RENAME UTILITY

(75) Inventors: Yen-Fu Chen, Austin, TX (US); Steven Christopher Oakes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/464,880

(22) Filed: Jun. 19, 2003

(65) Prior Publication Data

US 2004/0260693 A1 Dec. 23, 2004

(51) Int. Cl.
*G06F 17/30* (2006.01)
(52) U.S. Cl. .................. 707/200; 707/203
(58) Field of Classification Search .......... 707/1–6, 707/100, 104.1, 200, 203
See application file for complete search history.

(56) References Cited

U.S. PATENT DOCUMENTS

| | | | |
|---|---|---|---|
| 6,088,694 A | 7/2000 | Burns et al. ............. 707/8 |
| 6,272,678 B1 * | 8/2001 | Imachi et al. ............ 717/122 |
| 6,405,219 B2 * | 6/2002 | Saether et al. ........... 707/201 |
| 6,434,742 B1 * | 8/2002 | Koepele, Jr. ............. 717/140 |
| 6,484,186 B1 | 11/2002 | Rungta .................... 707/203 |
| 6,513,041 B2 | 1/2003 | Tarin ...................... 707/10 |
| 6,766,334 B1 * | 7/2004 | Kaler et al. .............. 707/203 |
| 6,832,371 B1 * | 12/2004 | Hussey ................... 717/165 |
| 6,865,583 B2 * | 3/2005 | Stockley ................. 707/202 |

\* cited by examiner

*Primary Examiner*—Cheryl Lewis
(74) *Attorney, Agent, or Firm*—Duke W. Yee; David A. Mims, Jr.; Gerald H. Glanzman

(57) ABSTRACT

A system and method that allows any user to perform a file name match in any Configuration Management (CM) environment. Given any source control tool, the present invention allows a user to access and retrieve previous names used of any file (or batch of files) for any specified version or all versions of a particular file or files.

34 Claims, 2 Drawing Sheets

CONFIGURATION MANAGEMENT FILE RENAME UTILITY

BACKGROUND OF THE INVENTION

1. Technical Field

This invention relates generally to version management in source control tools, and more particularly to a file rename matching tool usable in any Configuration Management (CM) environment.

2. Description of Related Art

Configuration management is the detailed recording and updating of information that describes a computer systems and networks, including all hardware and software components. Such information typically includes the versions and updates that have been applied to installed software packages and the locations and network addresses of hardware devices.

Configuration management is also used in software development. Writing computer programs is often a lengthy process involving multiple users who have access to edit the same source code document. One of the most common ways to manage source code developed in a software project is by using a source control tool of a CM environment. A source control tool prevents developers from overwriting each others code and gives the developers the ability to maintain and manage source code files within a given project.

Typical source control methods use a system of checking files in and out, somewhat akin to a library system. If a file is checked out, then no one else should be able to use or edit that file, until it is checked back in. Similarly, if no one has the file checked out, then no one should be able to edit it. Note, however, that anyone may still view the file at any time. This process ensures that no two people will ever edit the file at the same time. Also, by making sure that everyone checks files out properly through the application, no one's changes will ever be overwritten—unless it was on purpose. In a web application setting, one would normally store all files on a central server, though the files can be stored anywhere accessible by users. Each user would then download the file to his or her local computer, edit it, and upload it back to the server. There may also be a person working directly on the server as well. When the user downloads the file, they must check it out as well, and the reverse also applies when they upload the file.

The versioning feature incorporated into source control tools permits numbering of the source files placed into the tool repository, which allows the source files to be tracked upon creation of the files into the source control tool repository and any updates to the files thereafter. When a source code file has been updated or altered, a separate versioned file or the difference between the file and its previous version is created and can be tracked separately from the original source code file.

Though this method is widely used, it suffers from some drawbacks. For example, there is no mechanism in existing source control tools that links the original source file to a version of the file that has been renamed. This leads to an information tracking disconnect, as information about the original source file cannot be retrieved unless both the original and renamed versions of the file are known. Requesting information on the original source code file name does not return the new filename changes, and requests for the new file name do not return the previous (differently named) versions.

Therefore, there is a need in the art for a configuration management tool that allows a user to track changes between files, even when different versions of the file have been renamed.

SUMMARY OF THE INVENTION

The present invention, in a preferred embodiment, allows any user to perform a file name match in any Configuration Management (CM) environment. Given any source control tool, the present invention allows a user to access and retrieve previous names used of any file (or batch of files) for any specified version or all versions of a particular file or files.

In one example embodiment, the innovative program uses an existing source control tool's log to trace back and identify previous names of a given file, allowing comparison between differently named versions of the same file. The comparison can be accomplished, for example, by altering the pathname of a file to match with another, allowing a source line of code (SLOC) program to compare the two as if they were different versions of the same named file. Other embodiments are described below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
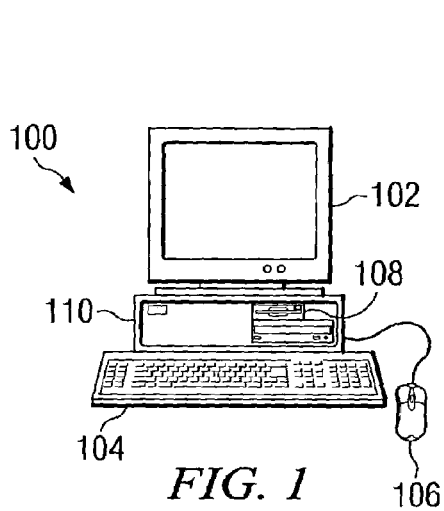
FIG. 1 shows a computer system consistent with implementing a preferred embodiment.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
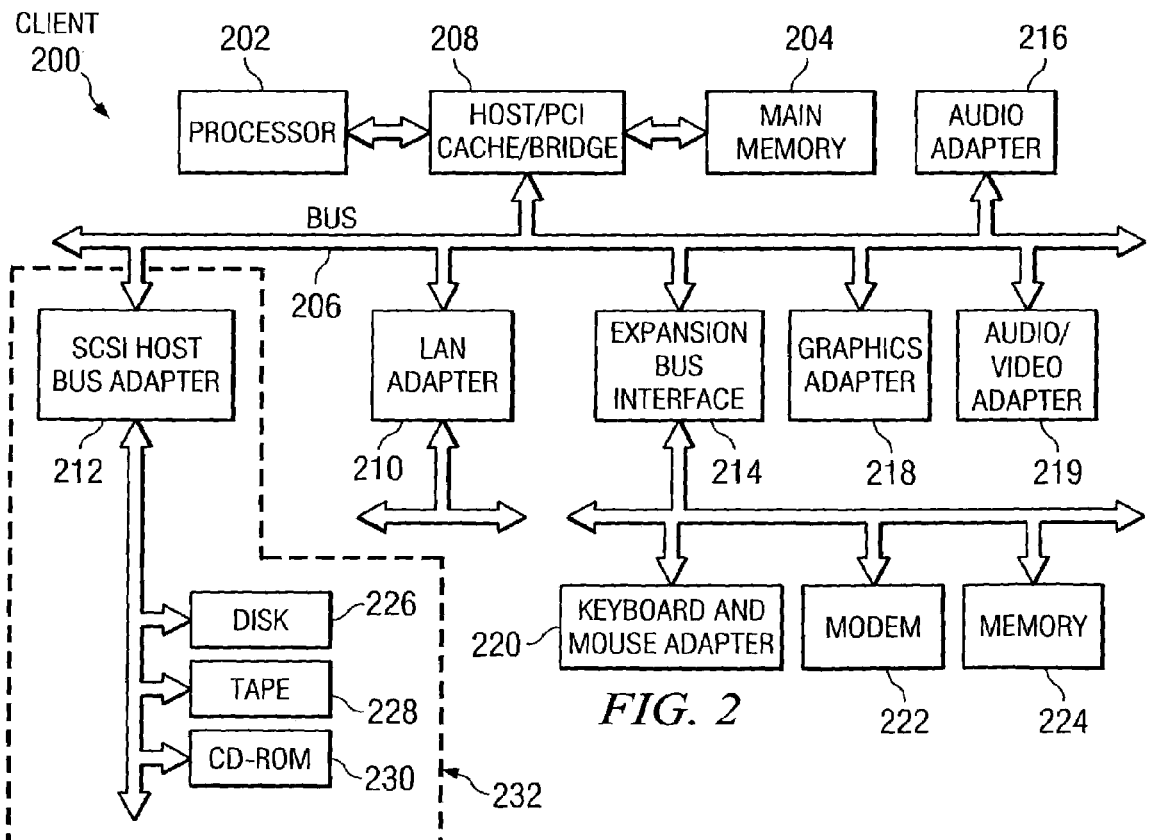
FIG. 2 shows a block diagram of a computer system consistent with a preferred embodiment.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention allows a user in a CM environment to keep track of old names for files. Given any source control tool, the user can access and retrieve previous names of any file (or multiple files) for any specified versions of the file.

In any CM tool, there is a method that allows users to implement the standard version control methods. For example, products such as Visual Source Save (VSS) by Microsoft and Configuration Management Version Control (CMVC) by IBM both include the versioning feature described above, which allows user check-in and check-out of files. These tools compress and store the files into an internal repository. When the user first creates the file in the tools repository, the file version is established. Then as later users check the file out and back in, the version of the file is automatically incremented by the versioning feature. However, if the file is renamed, this version tracking history is defeated because the CM tool treats the newly named version of the file as separate from those versions of the file with previous, different names. Thus, a user is unable to easily explore the file naming history of the file and is susceptible to loss of information between differently named versions.

The present invention, as detailed below, allows a user to track renamed versions of files in a CM environment.

For example, existing version control enables a user to track different versions of a file and gives the user the ability to view and retrieve any previous versions of the checked-in file. In a first example, users can choose to view any version of "abc.htm" using the CM tool, such as version "1.3". However, there is a limitation in existing source control tools in automatically and reliably tracking the previous names of the files. For instance, if three versions of "abc.htm" (1.1, 1.2, 1.3) exist in the source control's repository, and if the user decides to rename the file "abc.htm" to "def.htm", existing source control tools will begin to track the two differently named files individually, as two separate files, and begins to version them separately. Thus, any rename change on a file causes the tool to make a logical divergence or branch. This creates an obstacle for users because in order for a user to compare version 1.1 of "def.htm" with its previous version, the user must already know the name of the file from which it came, i.e., "abc.htm." The complexity grows if the user is attempting to accomplish the same goal for a group of files. Comparing such renamed files would require a user to perform the tedious and time consuming task of backtracking the name changes for every file in the source repository.

The present invention allows a user to conveniently select the source control and any file name(s) that resides in the source control's repository and be able to easily explore the file/naming history, and more easily perform functions to identify differences between the documents for on-the-fly viewing or extraction of those files on a local machine.

The present invention is preferably implemented in one of two ways. In a first embodiment, a plug-in or patch is added to an existing CM tool. Such a plug-in adds a "Rename Utility" (and possibly other functions) to a selected CM tool during installation. The plug-in can be designed so as to work with various CM tools, or different plug-ins can be designed for individual CM tools. The plug-in copies files to the "Rename Utility" directory (for example) under the CM tool's parent directory. Integrating the Rename Utility as a plug-in creates an entry in the CM tool's menu allowing users to take advantage of the Rename Utility functions through the familiar GUI (graphic user interface). Other features can also be added to the GUI, as described below.

Figure 3:
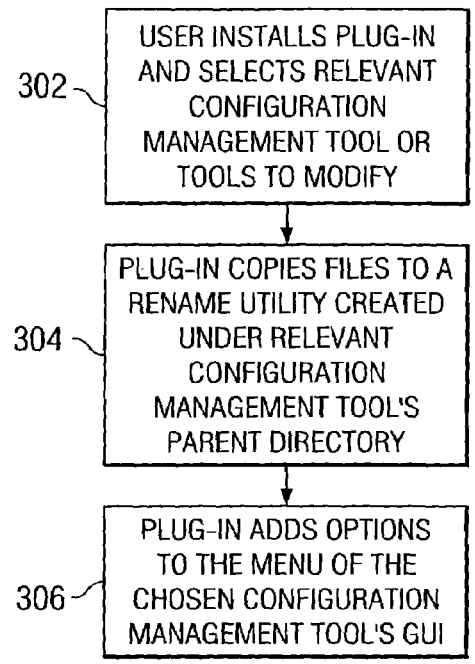
FIG. 3 shows a process flow for implementing the present invention as a plug-in to an existing CM tool.

FIG. 3 shows an example process flow for implementing the present invention as a plug-in to an existing CM tool. First, a user installs the plug-in and selects the relevant CM tool or tools to modify (step 302). The plug-in copies files to a Rename Utility created under the relevant CM tool's parent directory (step 304). The plug-in adds options to the menu of the relevant CM tool's GUI (step 306).

Figure 4:
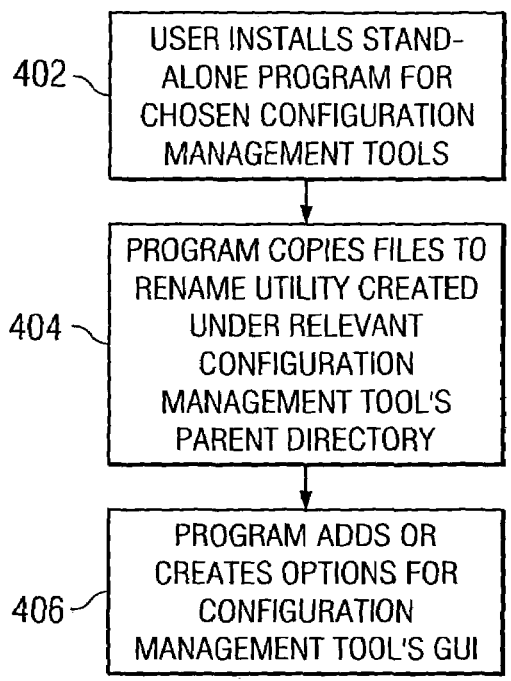
FIG. 4 shows a process flow for a way of implementing the present invention as a stand alone program.

FIG. 4 shows a process flow for a second way of implementing the present invention. In this embodiment, the added functionality is created by installing a stand-alone program instead of a plug-in (step 402). The stand alone program is preferably compatible with multiple different CM tools, though different stand-alone programs can also be used separately for different CM tools if necessary. The program copies files to the Rename Utility created under the relevant CM tool's parent directory (step 404). The program then creates or adds options to the CM tool's GUI (step 406).

In a preferred embodiment, the present invention, once installed as a plug-in or a stand-alone program, preferably adds the following features to the CM tool(s). These features preferably appear in the CM tool's GUI menu.

"Renamed File Extract . . . " executes on the files that have been extracted from a source control tool and matches the files that have been renamed. Depending on the usage, this embodiment can be configured so that if a file has been renamed, the user can view and select which full path (e.g., dir1/dir2/dir3/filename1) the file should be renamed to when extracting. This is useful if the user wants to run a source line of code (SLOC) counter program on the extracted files to identify changes. Instead of extracting "dir1/dir2/dir3/filename1" and "dir1/dir4/dir5/filename2" and having to manually review the renaming history of both paths to discover that "filename2" is a renamed version of filename1", this feature presents the user with input to allow the user to manually alter the full path of one of the two (i.e., filename1 or filename2) so that they are the same. This allows the SLOC counter to compare the two files as different versions of the same file. Alternately, instead of allowing the user to manually alter the paths, the SLOC counter can be set up so the program automatically knows to compare the t files as different versions of the same file. The SLOC can then be executed to obtain comparison results.

"Renamed File Create . . . " creates a separate file for all of the renamed files from an extraction.

"Renamed File Search" allows users of source control tools to find out if any file has been renamed. If the files have been renamed, depending on the source control's features to track time and user information, vital data such as when, by whom, comments, etc. can all be obtained form the source control and displayed.

This feature also provides renamed file search at different levels. File, files in a group, files in a project, all files in a given repository, as well as custom searches of files such as all files beginning with a particular path, etc.

"Renamed File Report . . . " shows a user a report of all renamed files and/or versions. This function can be limited to particular sets of files when executed, or all files of a given repository.

"Renamed File Caching On/Off . . . " allows caching of searches. This allows a user to set a number of searches for caching. The program then displays from the cache instead of connecting to a source control tool and retrieving rename information.

Once the Rename Utility is installed, just like the parent CM tool, command line options will be available for users who prefer to work using a console over GUI, which makes automation scripts possible.

Figure 5:
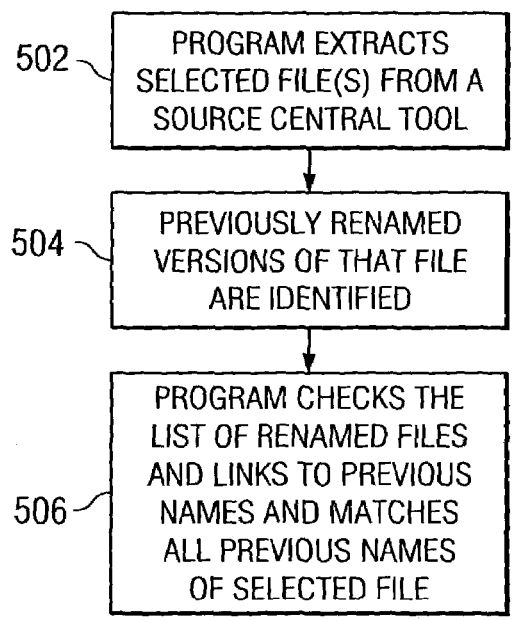
FIG. 5 shows an example process for matching new file names to their previous names or paths consistent with a preferred embodiment.

FIG. 5 shows an example process for matching new file names to their previous names or paths. In this embodiment, the program (be it stand alone or plug-in) extracts a selected file from a source control tool (step 502). Previous named versions of the file are identified (step 504) to produce a list of renamed files and their links to previous names. This can be accomplished in at least two ways. For example, a local (or network available) list of renamed files can be maintained to track renaming and make retrieval possible. Alternately, if the source control tool keeps a log of renamed files, the source control tool's own log can be accessed to compare and match to previously renamed versions of the selected file. Finally, the program checks the list of renamed files and their links to previous names to track down all previous names of a file (step 506).

Figure 6:
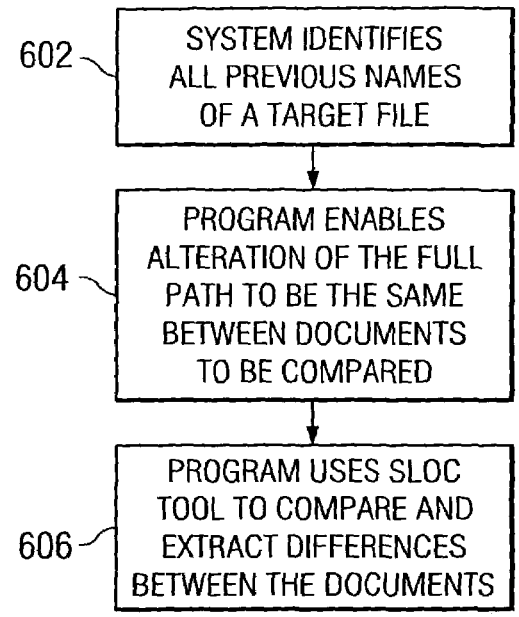
FIG. 6 shows an example process flow for comparing extracted or selected files consistent with a preferred embodiment.

FIG. 6 shows an example process flow for comparing extracted or selected files. First, the innovative system (be it a plug-in to an existing CM tool or stand alone) identifies all previous names of a target file using some method, such as that depicted in FIG. 5 (step 602). Next, the program enables alteration of the full path to be the same between the documents to be compared so the SLOC tool knows to compare them as different versions of the same file (step 604). In this embodiment, the program presents the user with an interface for manually altering the full pathnames locally so they are the same. Then, the program uses the SLOC tool to compare and extract differences between the target documents (step 606).

Figure 7:
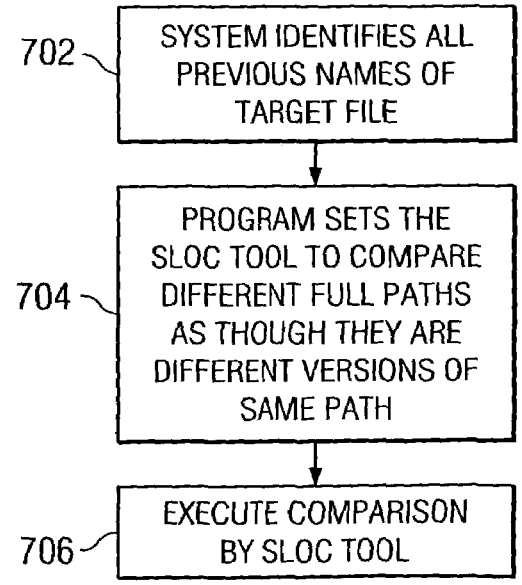
FIG. 7 depicts an alternate process flow for comparing extracted or selected files consistent with a preferred embodiment.

FIG. 7 depicts an alternate process flow for comparing extracted or selected files. First, the system identifies all previous names of a target file (step 702). The program then sets the SLOC tool to compare two different full paths (including different directories and/or filenames) as though they are different versions of a same document (step 704). The comparison is then executed (step 706) by the SLOC tool.

As described above, the present invention preferably executes on a file that has been extracted from a source control tool, matching a selected file with previous differently named versions of it, unlike current CM tools. Depending on the implementation, the invention can be configured so that if a file has been renamed, the user can view and select which full path the file should be renamed to when extracting. This is especially useful if the user intends to run a SLOC counter program on the extracted files. Instead of extracting "dir1/dir2/dir3/filename1" and "dir1/dir4/dir5/filename2" and having to manually review the renaming history list to figure out that "filename2" is actually the renamed and next version of "filename1", their full paths are changed to be the same, either manually or by altering existing programs to do this automatically. The present invention also preferably creates its own separate list of all renamed files from an extraction, though existing rename lists and histories from the CM tools can also be used, if applicable.

The present invention can be integrated with any source control tool to provide the rename tracking ability and rename reporting. Depending on the particular embodiment, the innovative program or plug-in allows users of source control tools to find out if any file has been renamed. If the file (or files) has (have) been renamed, vital data about the documents and changes can be returned. The rename search capability can be applied at different levels, from a single document to specific levels or groups of files, to all files in a given repository.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing renamed files in a configuration management environment, comprising the steps of:
    installing a plug-in to modify a source control tool of the configuration management environment to include a renaming utility, wherein the source control tool did not provide tracking of version history for files that have been renamed prior to installing the pug-in;
    extracting a first file that has been renamed from the source control tool of the configuration management environment using the renaming utility;
    matching the first file to a second file using the renaming utility, wherein the second file is a previous version of the first file having a different name, wherein the different name does not follow a versioning feature of the source control tool for the first file, wherein a version tracking history does not exist between the first file that has been renamed and the previous version of the first file, and wherein both the first file and the second file exist in the source control tool.

2. The method of claim 1, further comprising:
    altering a path to the first file to be the same as a path to the second file.

3. The method of claim 2, wherein the step of altering the path to the first file is done locally.

4. The method of claim 2, wherein the step of altering the path to the first file is performed automatically to compare the first file and second file using a source line of code counter program.

5. The method of claim 2, wherein the step of altering the path to the first file is automatically done by the source control tool upon identifying the first file and second file.

6. A computer implemented method of managing renamed files in a configuration management environment, comprising the steps of:
    modifying a source control tool of the configuration management environment to include a renaming utility, wherein the source control tool did not provide tracking of version history for files that have been renamed prior to modifying the source control tool;
    identifying a first file using the renaming utility;
    comparing the first file to a list of files including files that have been renamed using the renaming utility;
    matching the first file to a second file from the list of files using the renaming utility, wherein the first file is a renamed version of the second file, wherein the renamed version of the second file does not follow a versioning feature in the configuration management environment for the second file, wherein a version tracking history does not exist between the first file and the second file, and wherein both the first file and the second file exist in the configuration management environment.

7. The method of claim 6, wherein the list of files is from a repository of the configuration management environment.

8. The method of claim 6, wherein the list of files is maintained outside the configuration management environment.

9. The method of claim 6, further comprising the steps of:
    altering a path to the first file so the path to the first file matches the path to the second file; and
    comparing the altered path to the first file and the path to the second file using a source line of code counter program to determine that the first file is a renamed version of the second file.

10. The method of claim 9, wherein the path to the first file is altered manually.

11. The method of claim 9, wherein the path to the first file is altered by the source line of code counter program.

12. The method of claim 6, wherein the matching step further comprises:
    tracking the renamed files and links to previous names of the renamed files using the list of files, wherein the list of files is produced by identifying all previous names of the first file including renamed versions of the first file using the renaming utility.

13. The method of claim 6, further comprising the step of:
    selecting a path the first file should be renamed to when extracted from a source control tool.

14. A computer implemented system for managing renamed files in a configuration management environment, comprising:
    a source control tool in the configuration management environment having a repository, wherein the source control tool does not provide tracking of version history for files that have been renamed;
    a program that modifies the source control tool of the configuration management environment to include a renaming utility;
    a first file having a first full path;
    a second file having a second full path, wherein the second file is identified as a previous version of the first file with a different name, and wherein the different name does not follow a versioning feature of the source control tool for the first file, and wherein a version tracking history does not exist between the first file and the second file
    wherein the first file and second file are expected from the repository; and
    wherein the first full path is renamed to the second full path such that the source control tool can compare the first file and second file as different versions of the same file using the renaming utility.

15. The system of claim 14, wherein the first full path is renamed manually.

16. The system of claim 14, wherein the first full path is renamed automatically by the source control tool.

17. A computer program product executed by a processor for managing renamed files in a configuration management environment, comprising:
    first instructions for modifying a source control tool of the configuration management environment to add a renaming utility, wherein prior to adding the renaming utility, the source control tool did not provide tracking of version history for files that have been renamed;
    second instructions for identifying a first file using the renaming utility;
    third instructions for comparing the first file to a list of files including files that have been renamed using the renaming utility; wherein the list of files is produced by identifying all previous names of the first file;

fourth instructions for matching the first file to a second file from the list of files using the renaming utility, wherein the first file is a renamed version of the second file, wherein the renamed version of the second file does not follow a versioning feature in the configuration management environment for the second file, wherein a version tracking history does not exist between the first file and the second file; and wherein both the first file and the second file exist in the configuration management environment.

18. The computer program product of claim 17, wherein the list of files is from a repository of the configuration management environment.

19. The computer program product of claim 17, wherein the list of files is maintained outside the configuration management environment.

20. The computer program product of claim 17, further comprising:
instructions for altering a path to the first file so the path to the first file matches the path to the second file; and
instructions for comparing the altered path to the first file and the path to the second file using a source line of code counter program to determine that the first file is a renamed version of the second file.

21. The computer program product of claim 20, wherein the path to the first file is altered manually.

22. The computer program product of claim 20, wherein the path to the first file is altered by the source line of code counter program.

23. The computer program product of claim 17, wherein the matching step further comprises:
instructions for tracking the renamed files and links to previous names of the renamed files using the list of files, wherein the list of files is produced by identifying all previous names of the first file including renamed versions of the first file using the renaming utility.

24. The computer program product of claim 17, further comprising the step of:
instructions for selecting a path the first file should be renamed to when extracted from a source control tool.

25. A computer implemented system for managing renamed files in a configuration management environment, comprising:
means for modifying a source control fool of the configuration management environment to include a renaming utility, wherein the source control tool did not provide tracking of version history for files that have been renamed prior to modifying the source control tool;
means for identifying a first file using the renaming utility;
means for comparing the first file to a list of files including files that have been renamed using the renaming utility;
means for matching the first files to a second file from the list of files using the renaming utility, wherein the first file is a renamed version of the second file, wherein the renamed version of the second file does not follow a versioning feature in the configuration management environment for the second file, wherein a version tracking history does not exist between the first file and the second file, and wherein both the first file and the second file exist in the configuration management environment.

26. The system of claim 25, wherein the list of files is from a repository of the configuration management environment.

27. The system of claim 25, wherein the list of files is maintained outside the configuration management environment.

28. The system of claim 25, further comprising:
means for altering a path to the first file so the path to the first file matches the path to the second file; and
means for comparing the altered path to the first file and the path to the second file using a source line of code counter program to determine that the first file is a renamed version of the second file.

29. The system of claim 28, wherein the path to the first file is altered manually.

30. The system of claim 28, wherein the path to the first file is altered by the source line of code counter program.

31. The system of claim 25, further comprising:
means for tracking the renamed files and links to previous names of the renamed files using the list of files, wherein the list of files is produced by identifying all previous names of the first file including renamed versions of the first file using the renaming utility.

32. The system of claim 25, further comprising:
means for selecting a path the first file should be renamed to when extracted from a source control tool.

33. A computer implemented system for managing renamed files in a configuration management environment, comprising:
a source control tool, wherein the source control tool does not provide tracking of version history for files that have been renamed;
a program that modifies the source control tool of the configuration management environment to include a user interface;
a repository of files;
wherein the user interface includes an option that executes on files of the repository that have been extracted from the source control tool and matches files that have been renamed to previous versions of files, wherein the files that have been renamed do no follow a versioning feature of the source control tool for the previous versions of files, and wherein a version tracking history does not exist between the files that have been renamed and the previous versions of files.

34. The system of claim 33, wherein the path of at least a first file is altered to match that of a second file; and wherein the path of the first file is altered manually by a user through the user interface.

* * * * *